(12) United States Patent
Krampotich

(10) Patent No.: US 7,715,680 B2
(45) Date of Patent: May 11, 2010

(54) CABLE MANAGEMENT DRAWER WITH ACCESS PANEL

(75) Inventor: Dennis Krampotich, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/218,500

(22) Filed: Jul. 14, 2008

(65) Prior Publication Data

US 2009/0022470 A1 Jan. 22, 2009

Related U.S. Application Data

(63) Continuation of application No. 11/640,477, filed on Dec. 15, 2006, now Pat. No. 7,418,182, which is a continuation-in-part of application No. 11/546,538, filed on Oct. 10, 2006, now Pat. No. 7,437,049.

(51) Int. Cl.
*G02B 6/00* (2006.01)
(52) U.S. Cl. .................................. 385/135; 385/134
(58) Field of Classification Search ............. 385/135
See application file for complete search history.

(56) References Cited

U.S. PATENT DOCUMENTS

| | | | |
|---|---|---|---|
| 5,071,211 A | 12/1991 | Debortoli et al. | |
| 5,167,001 A | 11/1992 | Debortoli et al. | |
| 5,490,229 A * | 2/1996 | Ghandeharizadeh et al. | 385/135 |
| 5,497,444 A | 3/1996 | Wheeler | |
| 5,717,810 A | 2/1998 | Wheeler | |
| 6,301,424 B1 | 10/2001 | Hwang | |
| 6,438,310 B1 | 8/2002 | Lance et al. | |
| 6,504,988 B1 | 1/2003 | Trebesch et al. | |
| RE38,311 E | 11/2003 | Wheeler | |
| 6,792,190 B2 | 9/2004 | Xin et al. | |
| 6,944,389 B2 | 9/2005 | Giraud et al. | |
| 7,031,588 B2 * | 4/2006 | Cowley et al. | 385/135 |
| 7,079,744 B2 | 7/2006 | Douglas et al. | |
| 7,391,952 B1 * | 6/2008 | Ugolini et al. | 385/135 |
| 7,418,182 B2 | 8/2008 | Krampotich | |
| 7,437,049 B2 | 10/2008 | Krampotich | |
| 2002/0117942 A1 | 8/2002 | Audibert et al. | |
| 2005/0025444 A1 | 2/2005 | Barnes et al. | |
| 2005/0111809 A1 * | 5/2005 | Giraud et al. | 385/135 |
| 2006/0018622 A1 * | 1/2006 | Caveney et al. | 385/135 |
| 2006/0275008 A1 * | 12/2006 | Xin | 385/135 |
| 2007/0031099 A1 | 2/2007 | Herzog et al. | |
| 2008/0050083 A1 * | 2/2008 | Frazier et al. | 385/135 |
| 2008/0131067 A1 * | 6/2008 | Ugolini et al. | 385/135 |

OTHER PUBLICATIONS

U.S. App. No. 11/543,457; inventor Barnes; filed Oct. 4, 2006; *Slide Arrangement For Cable Drawer*.

* cited by examiner

*Primary Examiner*—Ryan Lepisto
(74) *Attorney, Agent, or Firm*—Merchant & Gould P.C.

(57) ABSTRACT

A cable management panel including a sliding drawer. The drawer including a bottom tray that pivots to provide access to cable management devices mounted on the tray. The drawer including a connection arrangement that locks the tray in both of a non-pivoted position and a pivoted position.

14 Claims, 14 Drawing Sheets

CABLE MANAGEMENT DRAWER WITH ACCESS PANEL

CROSS REFERENCE TO RELATED APPLICATIONS

This application is a continuation of application Ser. No. 11/640,477, filed Dec. 15, 2006 now U.S. Pat. No. 7,418,182; which is a continuation-in-part of application Ser. No. 11/546,538, filed Oct. 10, 2006 now U.S. Pat. No. 7,437,049; which applications are incorporated herein by reference.

TECHNICAL FIELD

This disclosure relates generally to methods and devices for managing telecommunication cables. More particularly, this disclosure relates to a cable management panel having a sliding drawer for managing fiber optic cables.

BACKGROUND

Cable management arrangements for cable termination, splice, and storage come in many forms. One type of cable management arrangement used in the telecommunications industry includes sliding drawers installed on telecommunication equipment racks. The drawers provide organized, high-density, cable termination, splice, and storage in telecommunication infrastructures that often have limited space.

To accommodate the massive scale of telecommunication infrastructures, and to maximize use of limited space, the drawers are sometimes stacked or mounted at heights above a comfortable working height. That is, the drawers can be stacked such that it is difficult to reach or access the interior of some drawers. Access is necessary in both the original installation of cables and subsequent adaptation or maintenance of the cables. There is a continued need in the art for better cable management devices and arrangements to address concerns regarding the ease of use of such cable management arrangements.

SUMMARY

The present disclosure relates to a cable management panel having a chassis and a slidable drawer. The slidable drawer has a tray on which cable management devices are mounted. The tray is pivotally mounted to a drawer frame of the drawer. Access to the cable management devices is provided by sliding the drawer out from the chassis, and pivoting the tray from a non-pivoted position to a pivoted position. The tray locks in place in both the non-pivoted position and the pivoted position.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
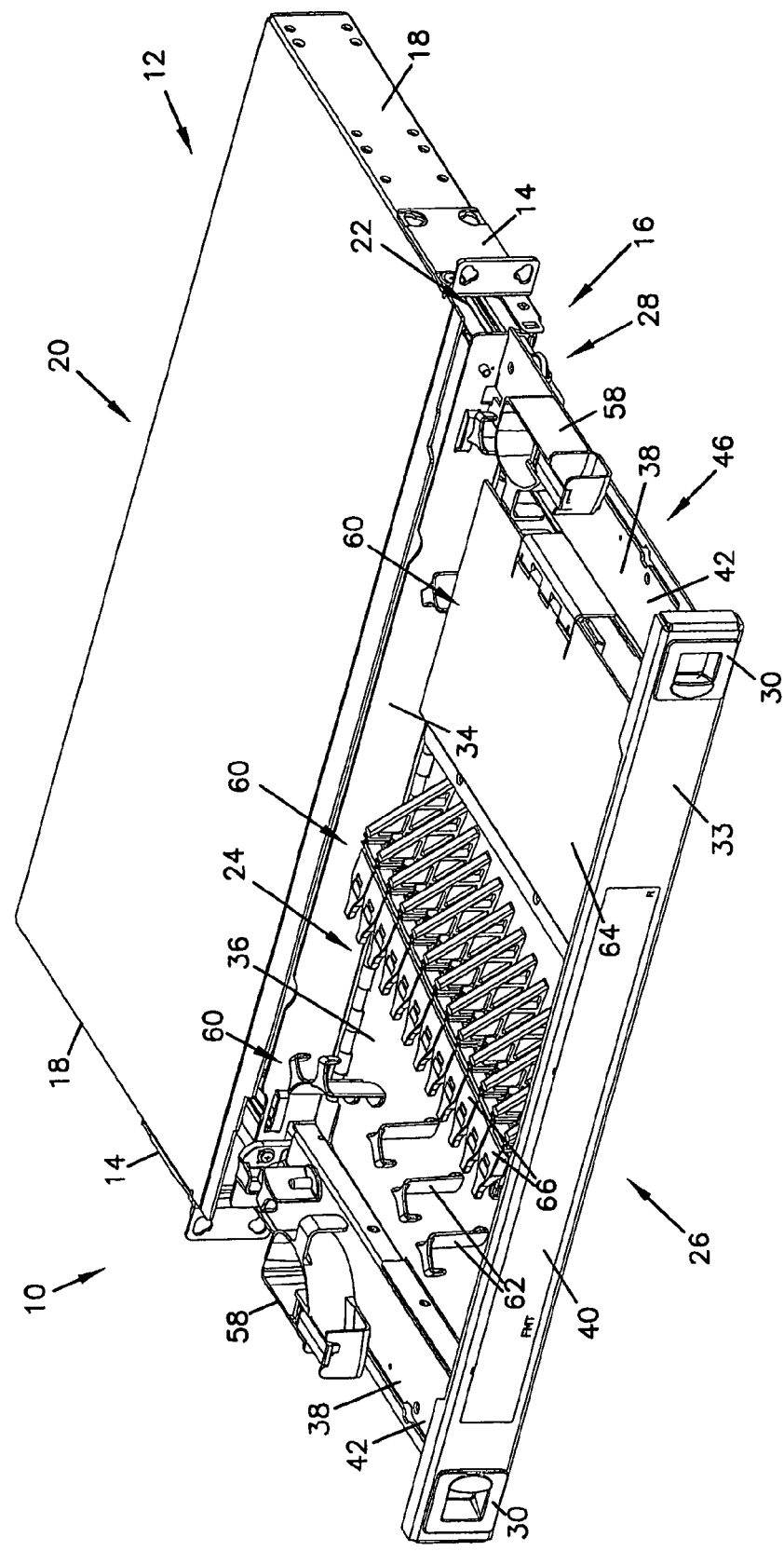
FIG. 1 is a front perspective view of one embodiment of a cable management panel according to the principles of the present disclosure, having a drawer that is shown in an open position.

Referring to FIG. 1, a cable management panel or module 10 according to the present invention is shown. The panel 10 includes a frame or chassis 12 having mounting brackets 14. The mounting brackets 14 are used to mount the panel 10 to a telecommunication structure, such as a telecommunication rack or frame. The cable management panel 10 can also be configured for mounting within a cabinet or enclosure, for example. Details of an example mounting bracket arrangement that can be used in accordance with the principles disclosed are described in U.S. Publication No. 2005/0025444, the disclosure of which is incorporated herein by reference.

Figure 2:
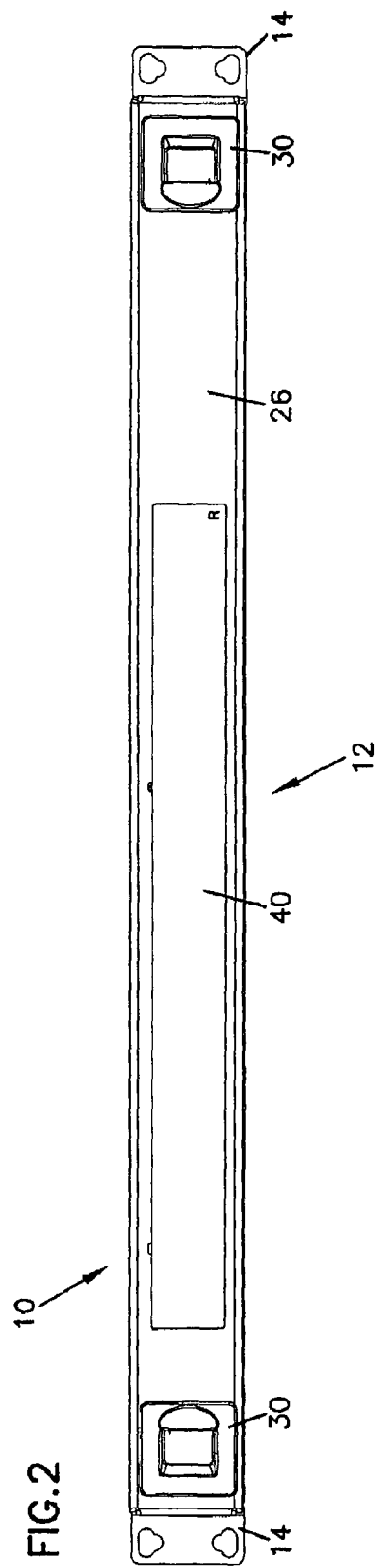
FIG. 2 is a front elevation view of the cable management panel of FIG. 1, shown with the drawer in a closed position.

The chassis 12 of the cable management panel 10 has a front 16, opposite sides 18, and a rear 20. The sides 18 define cable access openings 22 (see also FIG. 3) through which cables are routed into or out from the chassis 12. The chassis 12 further includes a drawer 26 that slides between an open position (FIGS. 1 and 3) and a closed position (FIG. 2). In the closed position, cables contained within an interior region 24 of the drawer 26 are enclosed and protected. In the open position, the cables can be accessed for maintenance purposes, for example.

Referring still to FIG. 1, the drawer 26 of the cable management panel 10 includes a front 33, a rear 34, a bottom tray (e.g., base plate or panel) 36, and sides 38. The sides 38 and rear 34 of the drawer generally define a drawer frame 46 to which the bottom tray 36 is attached. The front 33 of the drawer 26 is defined by an upright front drawer panel 40 that is attached to the tray 36. The upright front drawer panel 40 encloses the interior region 24 of the drawer 26 when the drawer is in the closed position. While the sides 38 of the drawer 26 are open, the sides 18 of the chassis are constructed to enclose the interior region 24 of the drawer 26 when the drawer is in the closed position.

The open sides 38 of the drawer 26 are provided to allow for cable entry and exit, and prevent cable damage during sliding movement of the drawer 26. Radius limiters 58 are located at the sides 38 of the drawer 26 for managing the exiting and entering cables during sliding movement of the drawer. The radius limiters 58 also act as guides for cables passing through the access openings 22, and protect the cables from damage by limiting cable bending beyond a minimum bend radius.

The open sides 38 of the drawer 26 are generally defined by horizontal side plates 42. The side plates 42 include longitudinal slots 52. The longitudinal slots 52 cooperate with the radius limiters 58 on each side of drawer 26. Preferably, the radius limiters 58 are moveably mounted relative to the chassis 12 and drawer 26. In one embodiment, movement of the radius limiters 58 is controlled in a synchronized manner relative to the movement of the drawer 26. Further details of example drawers having radius limiters, and drawers having radius limiters with synchronized movement are described in U.S. Pat. Nos. 6,438,310; 6,504,988; and 7,079,744; the disclosures of which are each incorporated herein by reference.

The drawer 26 in the illustrated embodiment includes a variety of cable management elements 60 (e.g., cable management components or structures and distribution components or devices). The interior region 24 of the drawer 26 is sized for receiving the cable management elements 60. When the drawer 26 is in the closed position, the cables and cable management devices or elements 60 in the interior region 24 are protected.

FIG. 1 illustrates one tray embodiment having various types of cable management elements 60. The elements 60 include cable retainers 62, a splice tray enclosure 64 housing splice trays, and adapters or connector holders 66 at which fiber optic connectors are mounted or located. As can be understood, the drawer 26 can be customized to include numerous forms of cable management elements 60 to accommodate the particular needs of the user. In addition to those elements 60 shown, examples of other cable management elements include other constructions, assemblies, and devices for storing the cables or connecting the cables to other cables; and/or other fiber optic devices, such as attenuators, couplers, switches, wave divisions multiplexers (WDMs), and splitters/combiners. Each of the references previously incorporated herein by reference, as well as U.S. application Ser. No. 11/196,523, which is incorporated herein by reference, describe other examples of customized element arrangements that can be provided in accordance with the principles disclosed.

Figure 6:
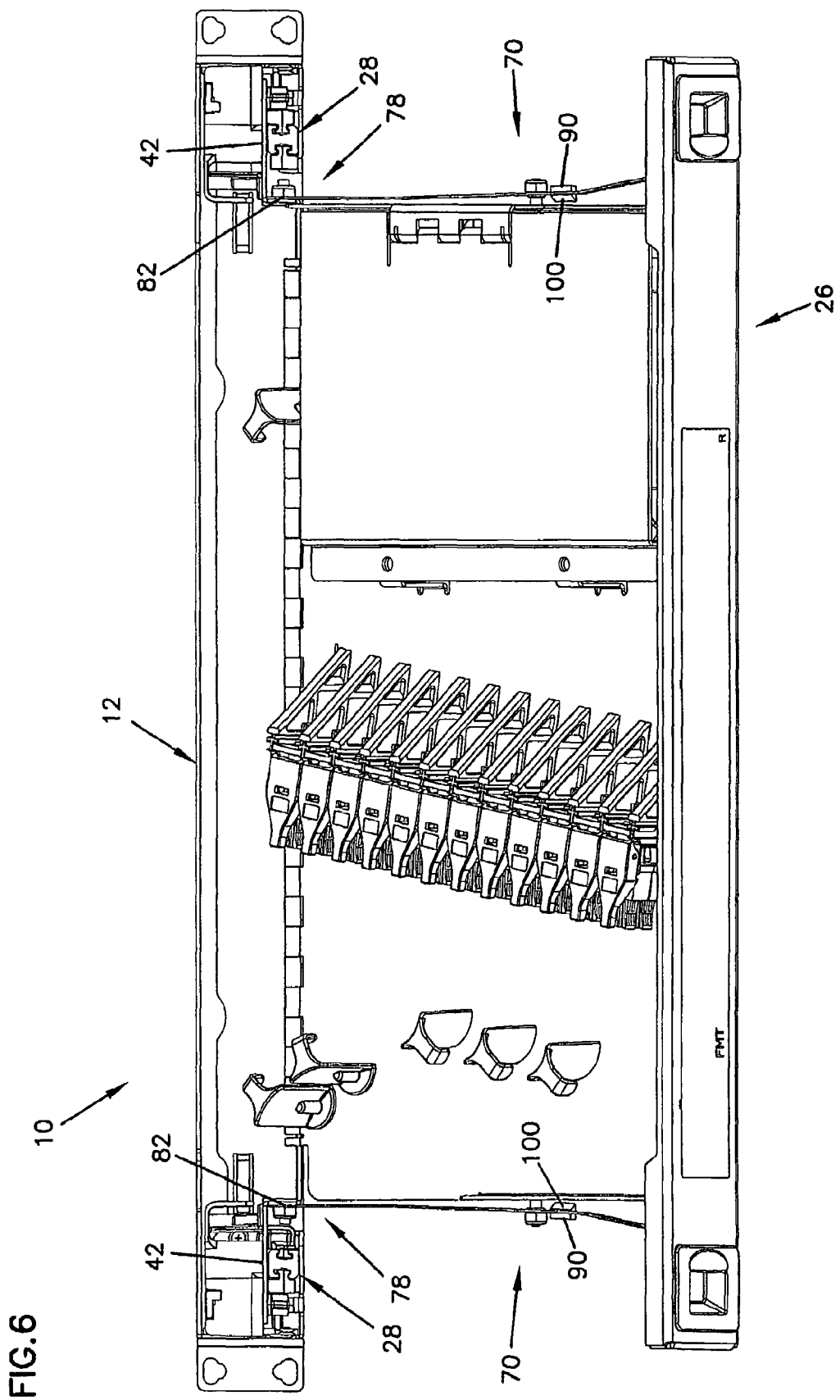
FIG. 6 is a front elevation view of the cable management panel of FIG. 5.
Figure 9:
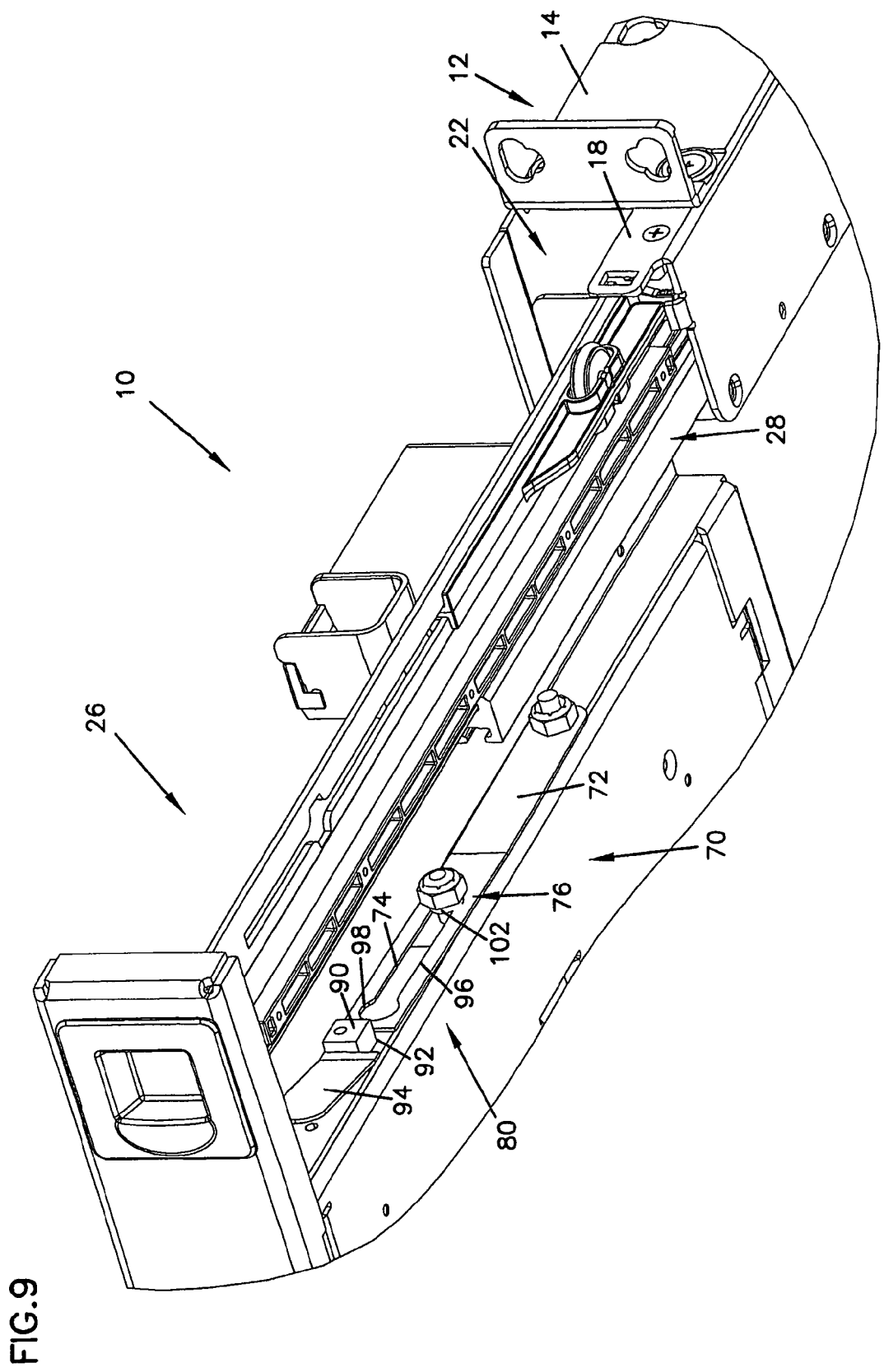
FIG. 9 is an enlarged perspective view of a portion of the cable management panel of FIG. 1.

The drawer 26 of the present cable management panel 10 slides relative to the chassis 12 via two drawer slide assemblies 28 (see also FIGS. 6 and 9). The drawer slide assemblies 28 are located adjacent to the opposite sides 18 of the chassis 12. Latches 30 are provided adjacent to both sides 38 of the drawer 26. The latches 30 secure the drawer 26 in the closed position by engaging a side hole 32 (FIG. 3) located at the side 18 of the chassis 12.

In the illustrated embodiment, the two drawer slide assemblies 28 each include three slide rails. Further details of one type of slide assembly that can be used are described in U.S. Publication No. 2005/0025444; previously incorporated herein by reference. Other slide assemblies that can be used are described in U.S. application Ser. No. 11/543,457; which application is also incorporated herein by reference.

The illustrated drawer slide assemblies 28 each include a stop arrangement (not shown). The stop arrangement limits the opening sliding movement of the drawer 26 beyond the open position to prevent inadvertent separation from the chassis 12. In the illustrated embodiment, the stop arrangement is an integral function of the drawer slide assembly 28. Further details of such an arrangement are described in U.S. Publication No. 2005/0025444; previously incorporated herein by reference.

Figure 3:
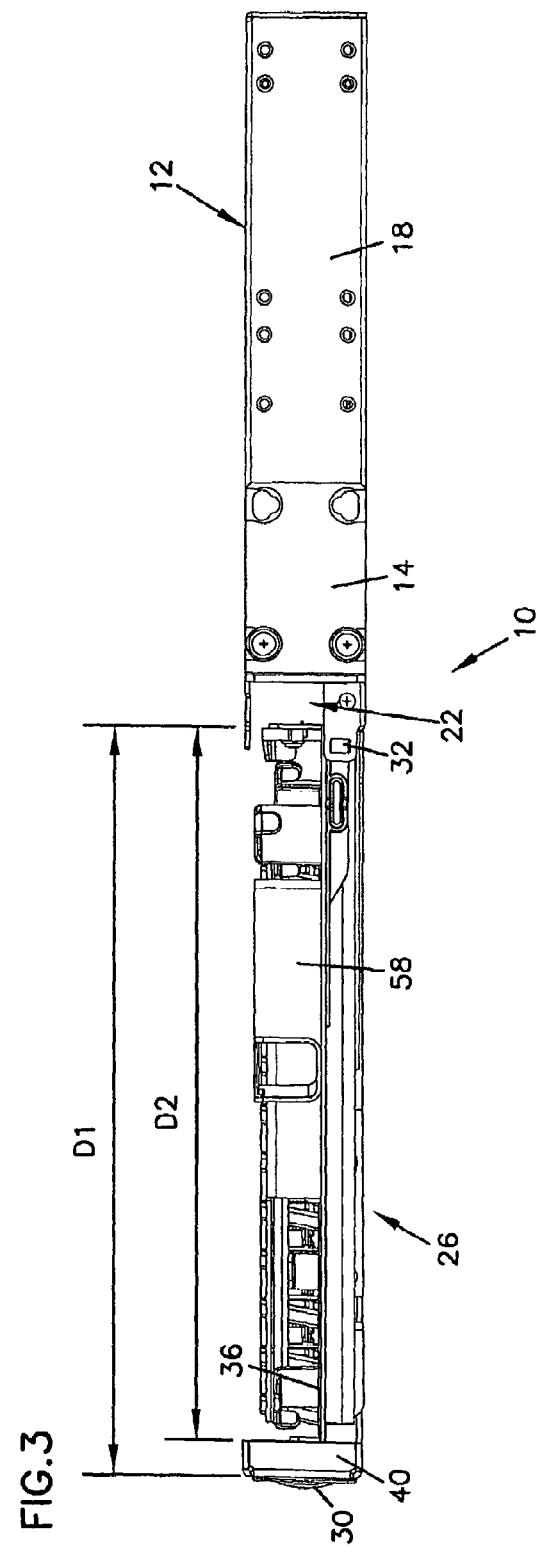
FIG. 3 is a side elevation view of the cable management panel of FIG. 1.

Referring now to FIGS. 1 and 3, the drawer 26 has a drawer depth D1 (FIG. 3) that extends between the front 33 (FIG. 1) of the drawer and the rear 34 of the drawer. The tray 36 has a tray depth D2 (FIG. 3) that extends a majority of the depth D1 of the drawer 26. In the illustrated embodiment, the depth D2 of the tray extends a substantial majority of the depth D1 of the drawer 26.

Figure 4:
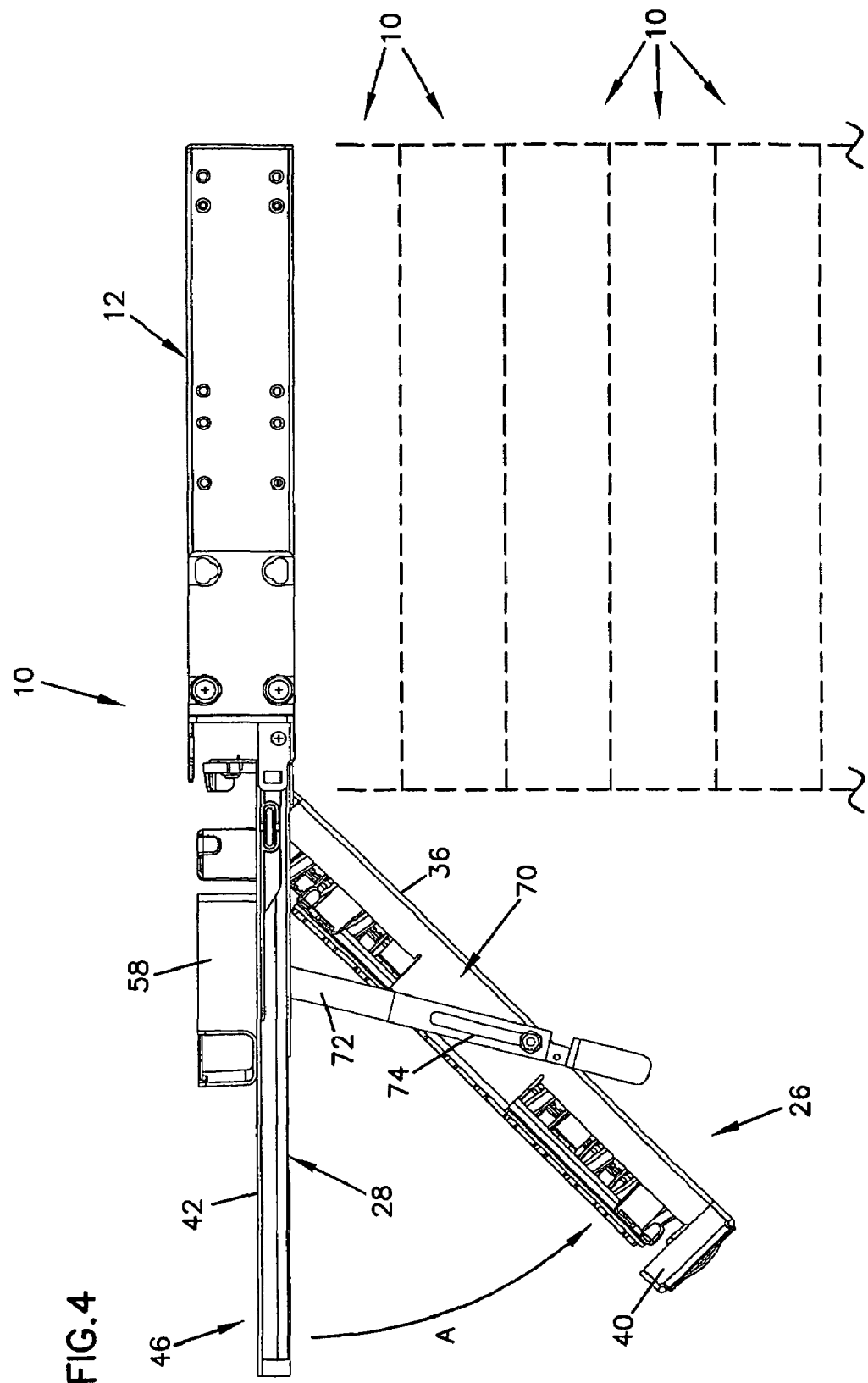
FIG. 4 is a side elevation view of the cable management panel of FIG. 3; shown with a tray of the drawer in a pivoted position.

In the present cable management panel 10, the tray 36 can be selectively pivoted from a first planar orientation, as shown in FIG. 1, to a second non-planar orientation, as shown in FIG. 4. The second "non-planar" orientation is an orientation that is "not co-planar" with the plane defined by the tray 36 when the tray is in a non-pivoted position, i.e. the first planar orientation. In one application, the tray 36 of the drawer 26 is oriented in a generally horizontal orientation, as shown in FIG. 3. The tray 36 can be selectively pivoted to a non-horizontal orientation, when the drawer is in the open position, to provide access to the cable management elements 60 mounted on the tray.

Figure 5:
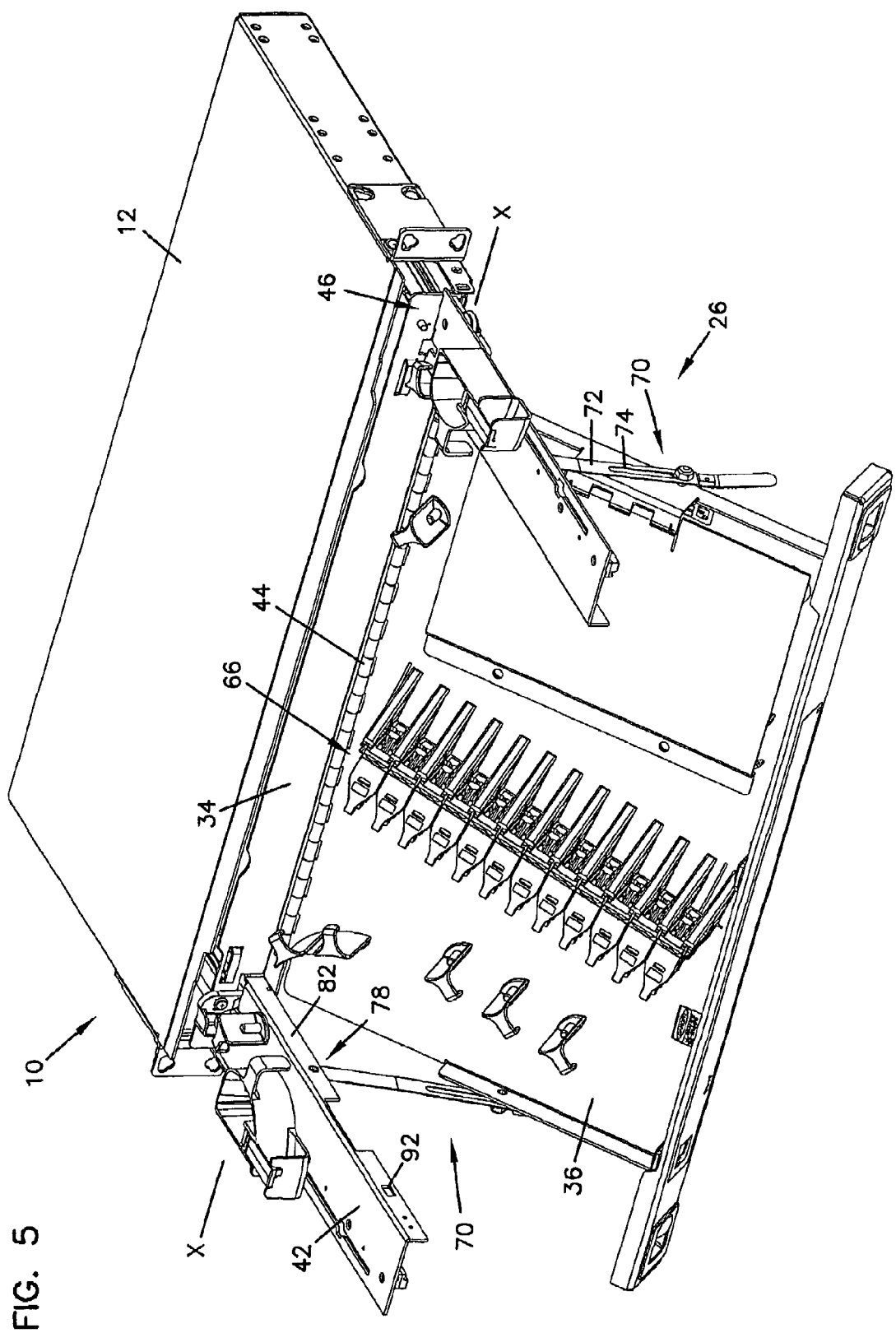
FIG. 5 is a front perspective view of the cable management panel of FIG. 4.

Referring now to FIGS. 4 and 5, the tray 36 is constructed to selectively hinge or pivot about an axis X-X (FIG. 5), as represented by arrow A (FIG. 4). A hinge or pivot mechanism 44 (FIG. 5) that connects the tray 36 to the rear 34 of the drawer defines the axis X-X. In the illustrated embodiment, the hinge 44 is arranged such that tray 36 pivots in a direction away from the frame 46 (e.g., the side plates 42) of the drawer 26. The pivoting tray 36 provides adaptable access to, for example, the connector holders 66 or connector locations, or other elements 60, mounted on the tray.

Referring still to FIGS. 4 and 5, the drawer 26 of the cable management panel 10 includes a connection arrangement 70 that limits the pivotal movement of the tray 36 relative to the frame 46 of the drawer 26. In the illustrated embodiment, the connection arrangement 70 is a pin and slide connection that releaseably locks the tray 36 in both the non-pivoted position (FIG. 3) and a pivoted position (FIG. 4).

Figure 7:
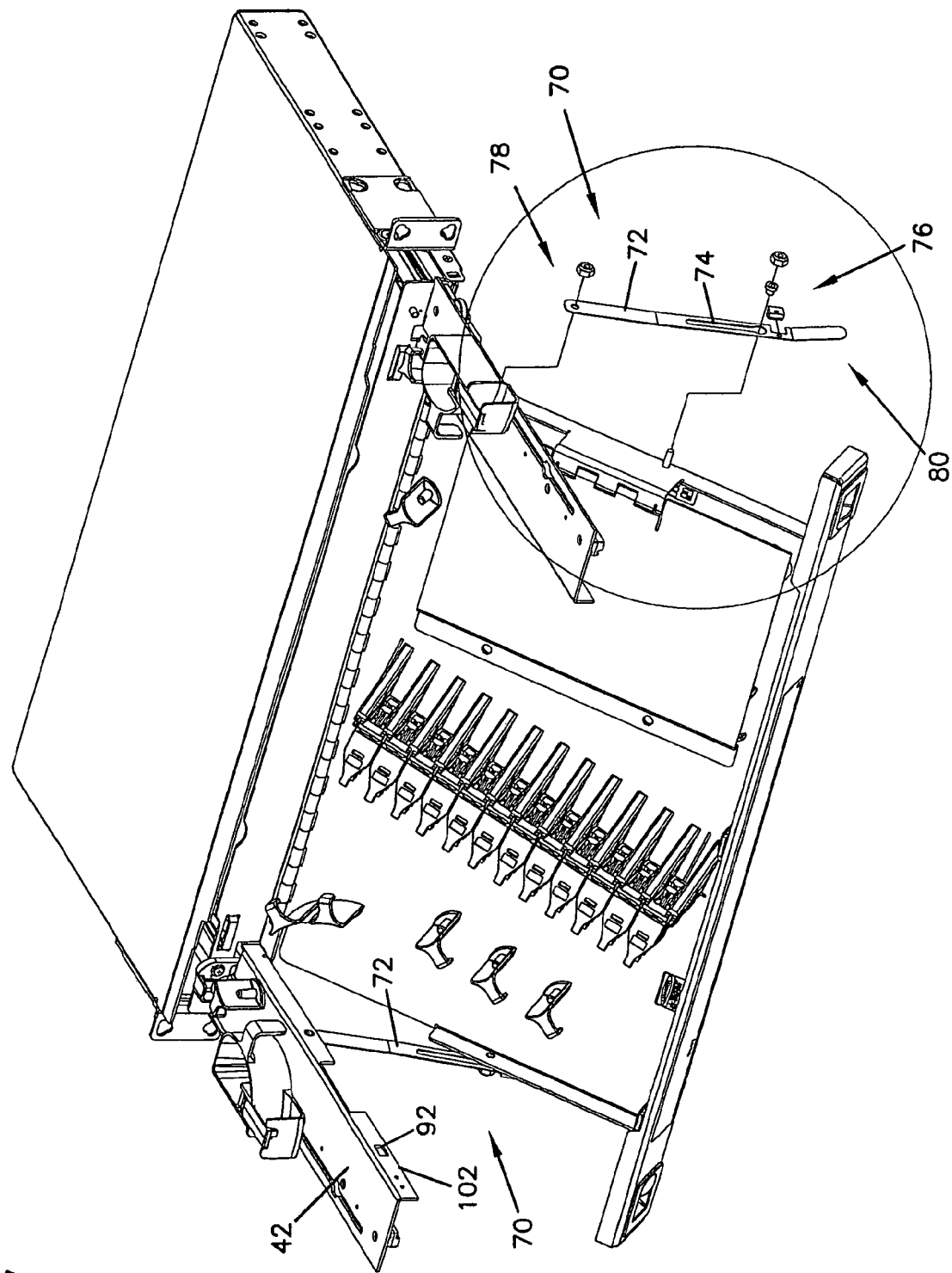
FIG. 7 is a partially exploded, front perspective view of the cable management panel of FIG. 5.
Figure 8:
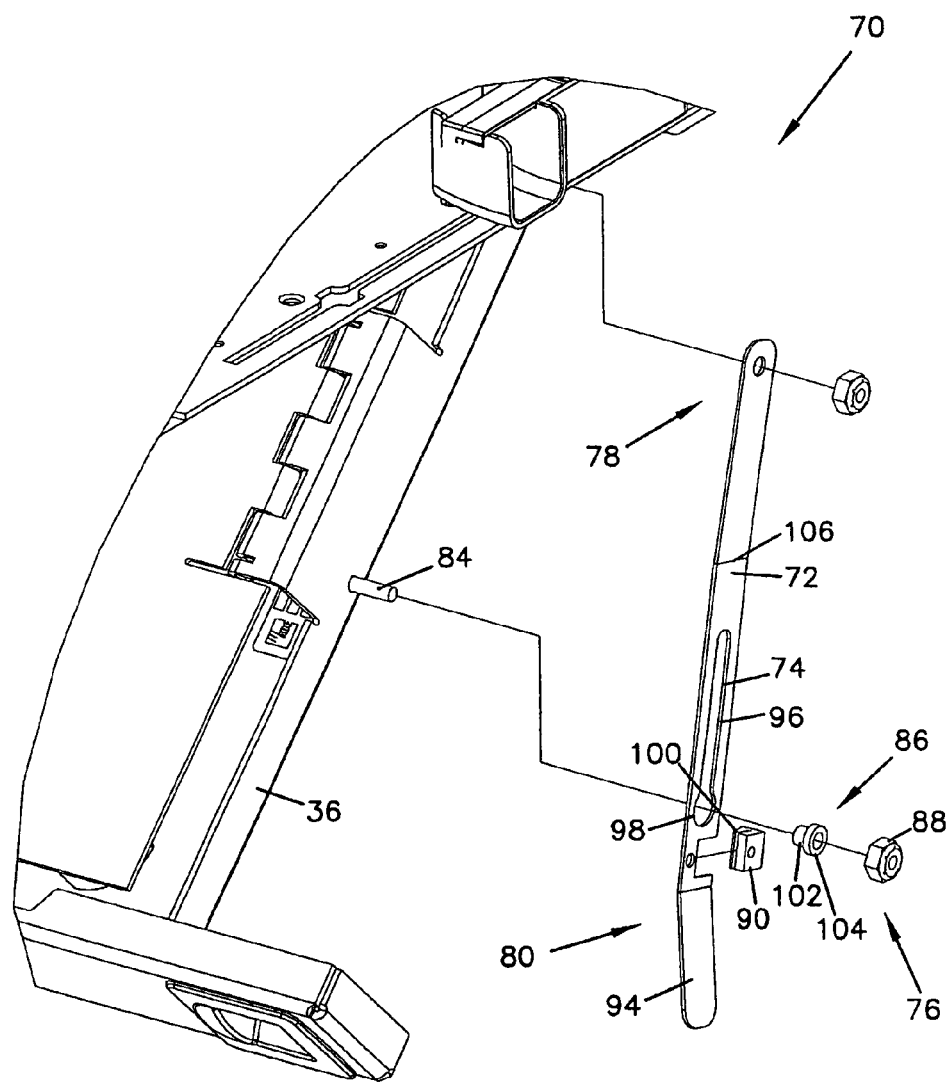
FIG. 8 is an enlarged detail view of FIG. 7.

Referring to FIGS. 7 and 8, the connection arrangement 70 generally includes a linkage or lever arm 72 and a pin assembly 76. The lever arm 72 has a first end 78 and a second end 80. As shown in FIG. 6, the first end 78 of the lever arm 72 is pivotally attached to a flange 82 of the side plate 42 of the drawer 26 (see also FIG. 5). The lever arm 72 is also slidably attached to the tray 36 adjacent to the second end 80 of the arm. That is, the lever arm 72 defines a slide or slot 74 that cooperates with the pin assembly 76 to provides a pin and slot connection between the tray 36 and the drawer frame 46.

Referring now to FIG. 8, the pin assembly 76 of the connection arrangement 70 includes a bushing or plug body 86 having a first smaller diameter portion 102 and a second larger diameter portion 104. The plug body 86 is mounted on a pin 84, which is attached or affixed to the tray 36. A lock nut 88, for example, can be used to secure the plug body 86 to the pin 84.

Still referring to FIG. 8, the connection arrangement 70 also includes a lock piece 90. The lock piece 90 is secured to the second end 80 of the lever arm 72. While in the illustrated embodiment, the lock piece 90 is a separate piece from that of the lever arm 72, it is contemplated that the lock piece can be an integral construction of the lever arm. In use, the pin assembly 76 functions to releaseably lock the tray 36 in the pivoted position, while the lock piece 90 functions to releaseably lock the tray 36 in the non-pivoted position.

In the illustrated embodiment, the lever arm 72 of the connection arrangement 70 is flexibly constructed. The lever arm 72 can be constructed of spring steel, for example, or in the alternative, can be of a molded construction. The slot 74 of the lever arm 72 has a slide portion 96 and an end portion 98. The slide portion 96 of the slot 74 corresponds in size to the smaller diameter portion 102 of the plug body 86 of the pin assembly 76. The end portion 98 of the slot 74 corresponds in size to the larger diameter portion 104 of the plug body 86.

In the illustrated embodiment, the second end 80 of the lever arm 72 is a biased end having a formed angular construction that acts as a leaf-type spring. In one embodiment, the lever arm 72 is angled in a region 106 at an approximate 2 degree offset from the first end 78 of the arm.

In FIG. 9, the drawer 26 is shown in the open position with the tray 36 in the non-pivoted position. The tray 36 is locked in this non-pivoted position via the lock piece 90. In particular, the lock piece 90 engages a corresponding aperture or hole 92 (see also FIG. 5) formed in the flange 82 of the side plate 42 to lock the tray 36 in the non-pivoted position. In the position shown in FIG. 9, the biased end 80 of the lever arm 72 is flexed inward toward the tray 36 of the drawer 26, and retained by the larger diameter portion 104 (FIG. 8) of the pin assembly 76. That is, in the position shown, the biased end 80 of the lever arm 72 is squeezed or moved inward toward the tray 36, as only the smaller portion diameter 102 of the pin assembly 76 fits within the slide portion 96 of the slot 74. The larger diameter portion 104 of the pin assembly prevents the biased end 80 from springing back or moving outward from the tray 36. The lock piece 90 at the biased end 80 of the lever arm 72 is thereby also retained in position, i.e., in engagement with the hole 92 so that the tray 36 remains locked in the non-pivoted position.

The flexible construction of the lever arm 72, however, permits a technician to release the tray 36 from the locked non-pivoted position by flexing the lever arm 72 outward from the tray 36. The lever arm is, in essence, flexed around the larger diameter portion 104 of the pin assembly 76 in a direction away from the flange 82 of the side plate 42. An angled tab 94 is provided at the second end 80 of the arm to assist the technician in grasping and flexing the lever arm. The outward flexure of the lever arm 72 disengages the lock piece 90 from the aperture 92.

When the lock piece 90 is disengaged from the aperture 92, the tray 36 can be pivoted to the pivoted position shown in FIG. 5. While pivoting the tray 36, the smaller diameter portion 102 of the plug body 86 slides within the slide portion 96 of the slot 74. Pivoting motion of the tray 36 is limited at a point where the pin assembly 76 seats within the end portion 98 of the slot 74. In some embodiments, the connection arrangement 70 can be designed to permit the tray 36 to pivot between about 0 degrees and 60 degrees relative to the non-pivoted position. In the illustrated embodiment, the tray 36 pivots approximately 45 degrees relative to the non-pivoted position.

When the tray reaches the pivoted position, the tray 36 automatically locks into place. That is, in the pivoted position, the biased end 80 of the lever arm 72 is no longer constrained by the plug body 86. Instead, as shown in FIG. 6, the end portion 98 of the slot 74 now moves laterally outward to position about or engage the larger diameter 104 of the plug body. The lateral outward movement is caused by the biased construction of the flexible arm. Because the slide portion 96 of the slot 74 is sized to receive only the smaller diameter portion 102 of the pin assembly 76, the tray 36 is thereby locked in the pivoted position. This is desirable during installation and maintenance procedures as the technician will be, for example, pulling on cables attached to the tray.

Figure 12:
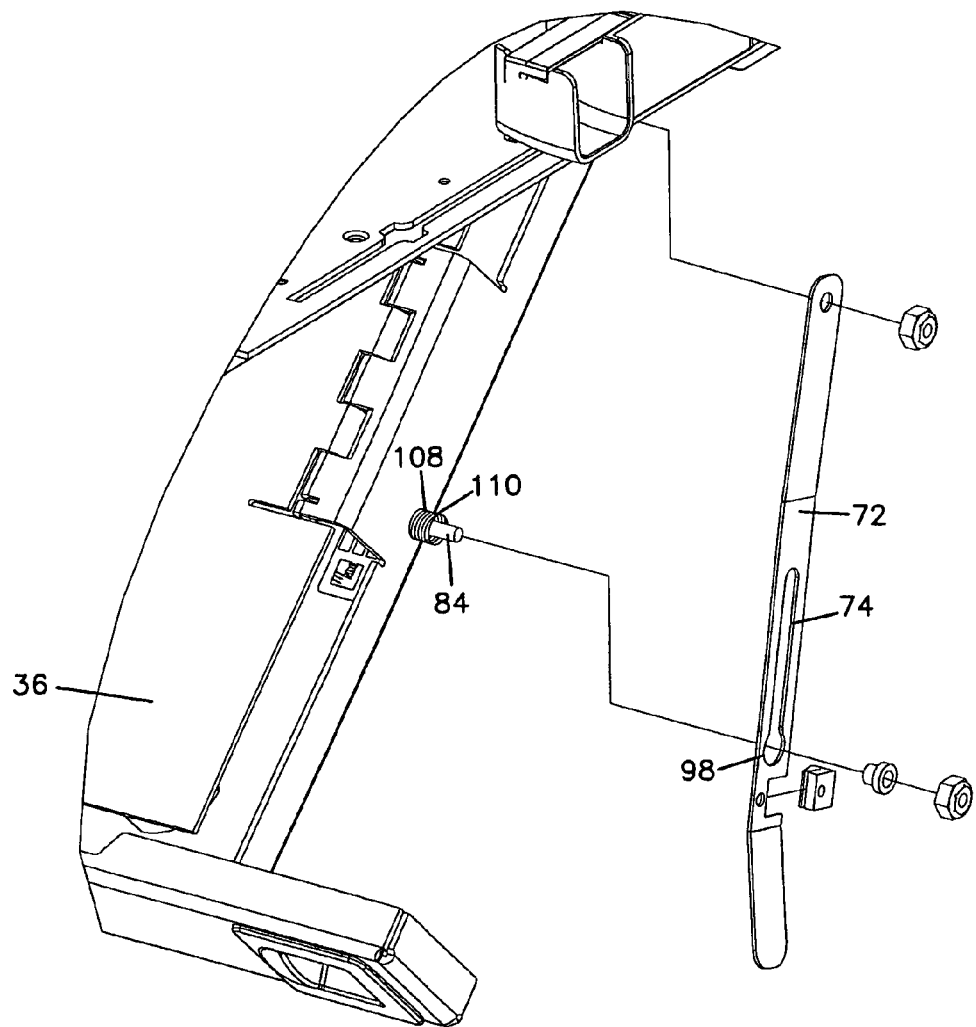
FIG. 12 is an enlarged detail view of FIG. 7, schematically representing an alternative biasing arrangement of the cable management panel.

In an alternative embodiment, the tray 36 can automatically lock into the pivoted position via a spring assembly. For example, as schematically represented in FIG. 12, the end portion 98 of the slot 74 of the lever arm 72 can be biased outward by a spring 108. In this embodiment, the spring 108 is retained about the pin body 84 attached to the tray 36; and a washer 110 is positioned between the spring 108 and the lever arm 72. The spring 108 can assist in laterally biasing the angled lever arm 72 or can solely provide the biasing force onto a non-angled lever arm.

Referring back to FIGS. 6 and 9, to release the tray from the locked position, the lever arm 72 is simply flexed inward toward the tray 36 such that the slot 74 aligns with the smaller diameter portion 102 of the plug body 86. The smaller diameter portion of the plug body 86 then slides upward within the slide portion 96 of the slot 74 as the tray 36 is pivoted back to the non-pivoted position.

Upon returning the tray 36 to the non-pivoted position, a ramped surface 100 (see FIGS. 6 and 8) of the lock piece 90 contacts an edge 106 (FIG. 7) of the flange 82 of the side plate 42. The ramped surface 100 acts as a guide to ease the engagement between the side plate 42 and the lever arm 72. As the tray 36 is further pivoted, the lock piece 90 seats within the aperture 92 formed in the flange 82 to automatically lock the tray 36 in the non-pivoted position.

In general, the present cable management panel 10 provides adaptable access to cable management elements protected within the panel. What is meant by adaptable is that the present cable management panel 10 can be used simply as a drawer that slides in and out of the chassis, or can be used by employing the features of the pivoting tray, as described above. The pivoting tray feature is particularly convenient in applications where the panel 10 is stacked upon other panels (as schematically represented in FIG. 4) or mounted above a comfortable working height. With the present panel 10, the technician can more easily access higher mounted panels by simply sliding the drawer out from the chassis 12, and pivoting the drawer bottom or tray 36 downward. In the pivoted position, the cable management elements 60 mounted on the pivoted tray 36 are more easily accessed as the bottom of the drawer 26 (i.e. the tray 36) now faces the technician.

Figure 10:
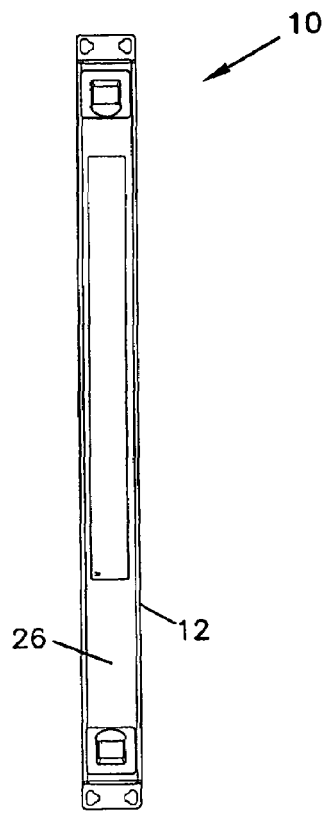
FIG. 10 is front elevation view of the cable management panel of FIG. 1, shown in an application wherein the panel is vertically mounted.
Figure 11:
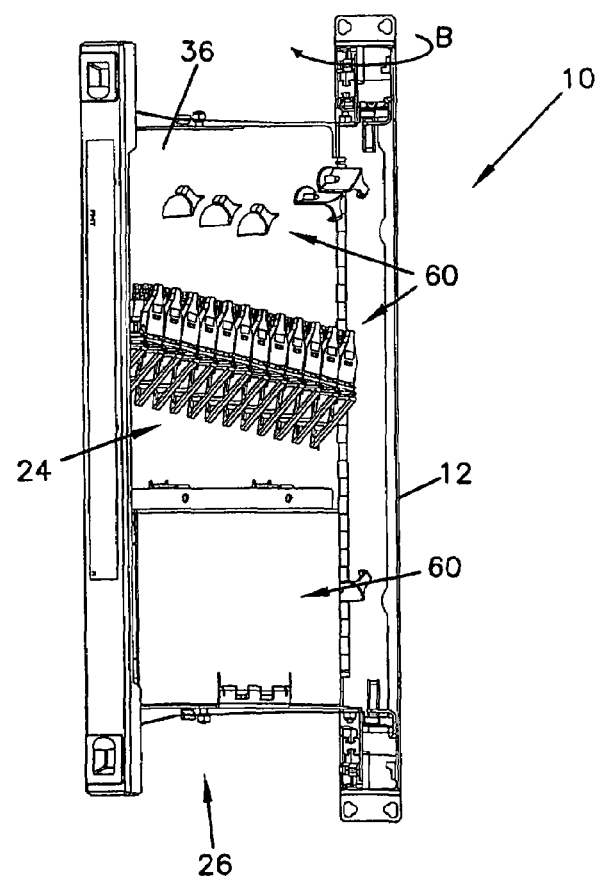
FIG. 11 is a front elevation view of the cable management panel of FIG. 10, shown with the drawer in an open position, and the tray of the drawer in a pivoted position.

Referring now to FIGS. 10 and 11, in an alternative application, the cable management panel 10 can be vertically mounted such that the drawer 26 and tray 36 are oriented in a generally vertical orientation. To access the interior region 24 of the drawer 26, the technician simply slides the drawer 26 out from the chassis 12, and pivots the chassis either to the right, or to the left (as shown by arrow B in FIG. 11), depending upon the vertical orientation of the panel 10. This arrangement is convenient in applications where lateral space, i.e., space located adjacent to the panels, is limited. Instead of standing along side the drawer 26 to face the interior region 24, or twisting sideways to access the elements 60 in the interior region 24, the technician can instead stand in front of the drawer and pivot the vertical tray 36 such that the interior region 24 of the drawer 26 forwardly faces the technician.

Figure 13:
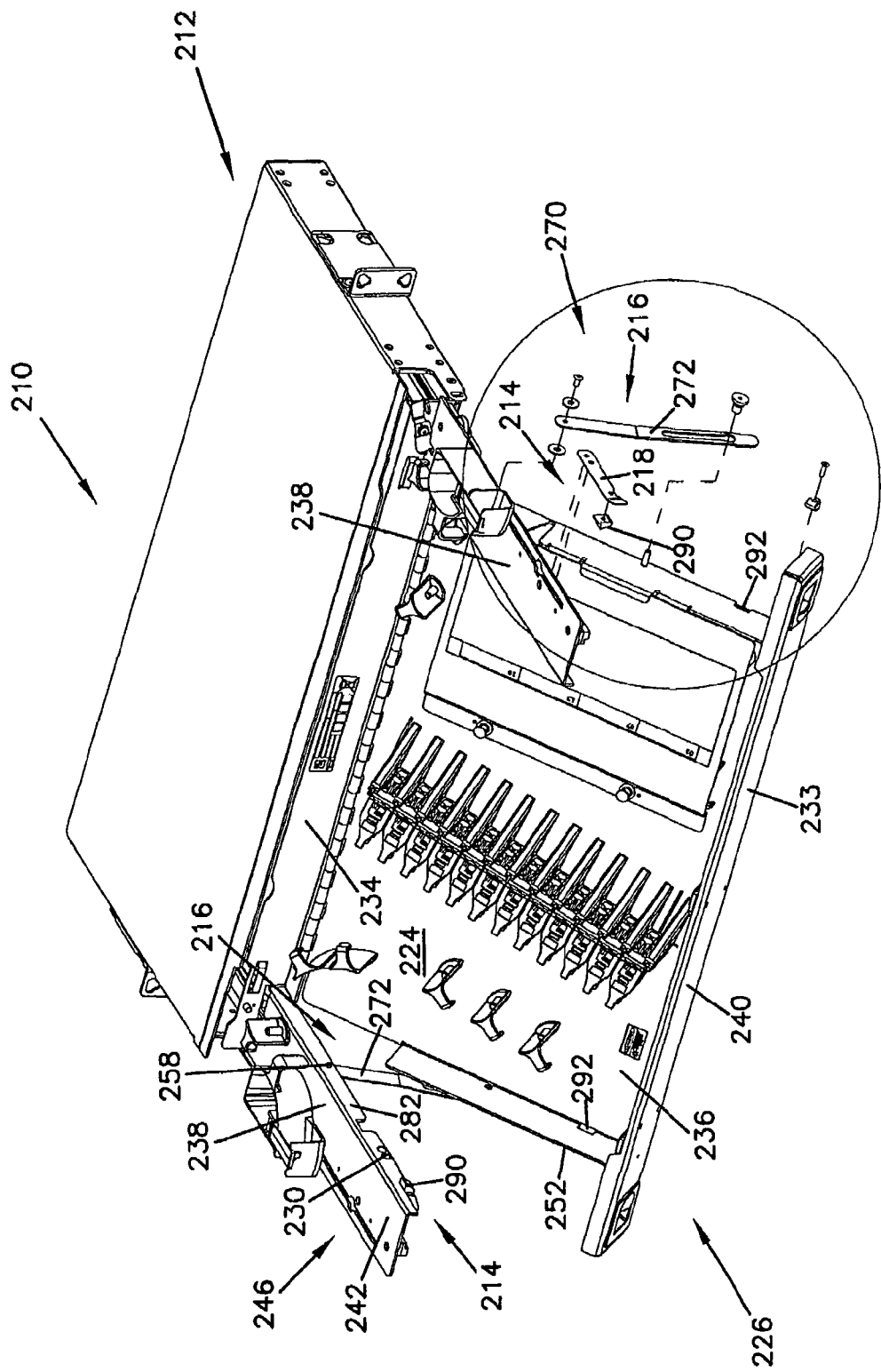
FIG. 13 is a partially exploded, front perspective view of another embodiment of a cable management panel, according to the principles of the present disclosure.

Referring now to FIG. 13, another embodiment of a cable management panel 210 is illustrated. The cable management panel 210 is similar to the panel 10 of FIGS. 1-9, with the exception of the connection arrangement that limits the pivotal movement of the tray relative to the frame of the drawer.

Figure 15:
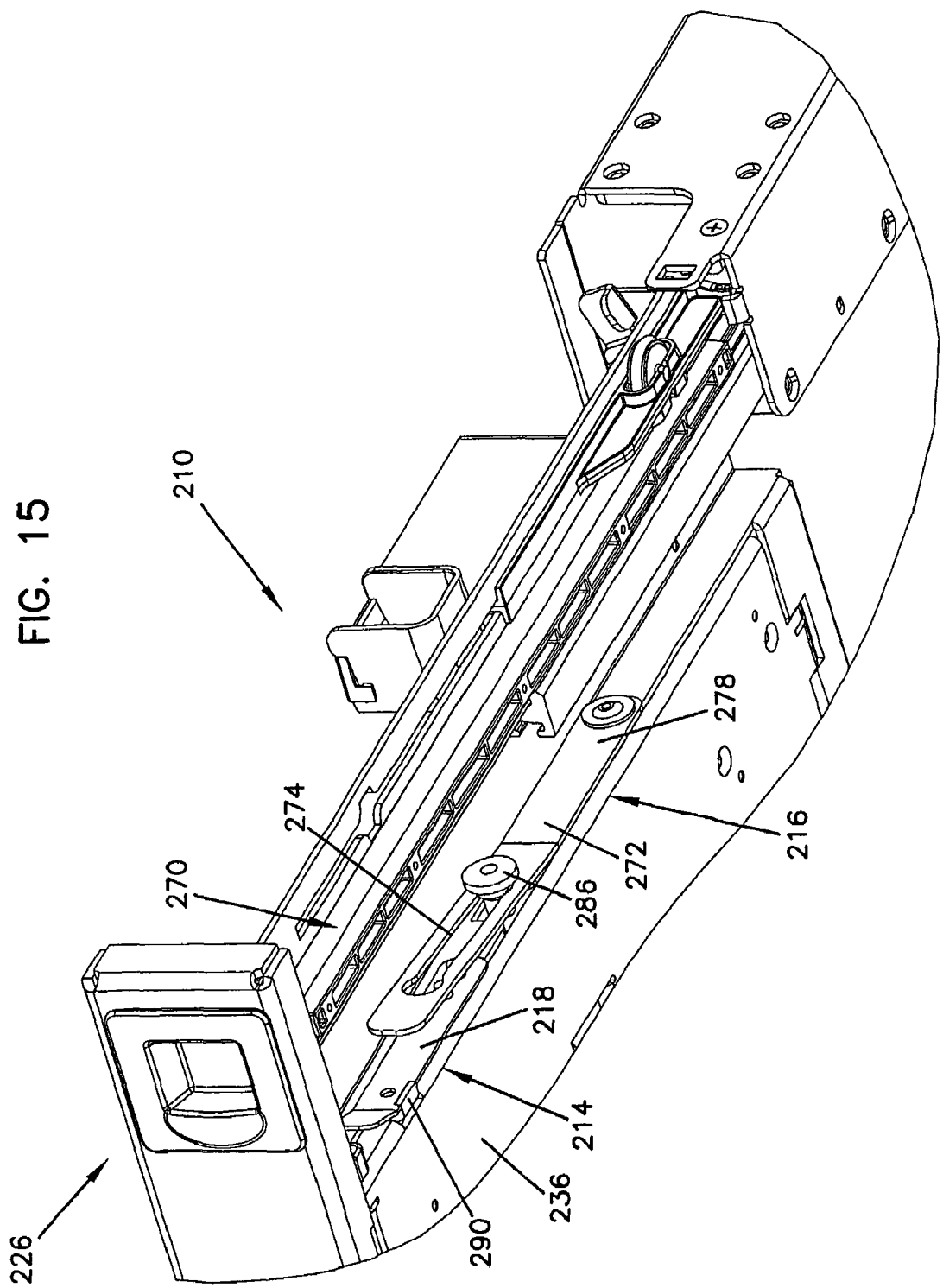
FIG. 15 is an enlarged perspective view of a portion of the cable management panel of FIG. 13.

Similar to the previous embodiment, the cable management panel 210 includes a chassis 212 and a drawer 226. The drawer 226 of the cable management panel 210 has a front 233, a rear 234, a bottom tray (e.g., base plate or panel) 236, and sides 238. The sides 238 and rear 234 of the drawer generally define a drawer frame 246 to which the bottom tray 236 is attached. The front 233 of the drawer 226 is defined by an upright front drawer panel 240 that is attached to the tray 236. The upright front drawer panel 240 encloses an interior region 224 of the drawer 226 when the drawer is in the closed position. Also similar to the previous embodiment, in the present cable management panel 210, the tray 236 can be selectively pivoted from a first planar orientation, as shown in FIG. 15, to a second non-planar orientation, as shown in FIG. 13.

Referring still to FIG. 13, the present panel 210 has a connection arrangement 270 different from that of the previous embodiment. The connection arrangement 270 includes a first latching connection 214 that releaseably locks that tray 236 in the non-pivoted position (FIG. 15) and a separate second connection 216 that releaseably locks the tray 236 in the pivoted position (FIG. 13). Each of the first and second connections 214, 216 is independent of the other; i.e., is a separate component that functions independent of the other component.

Figure 14:
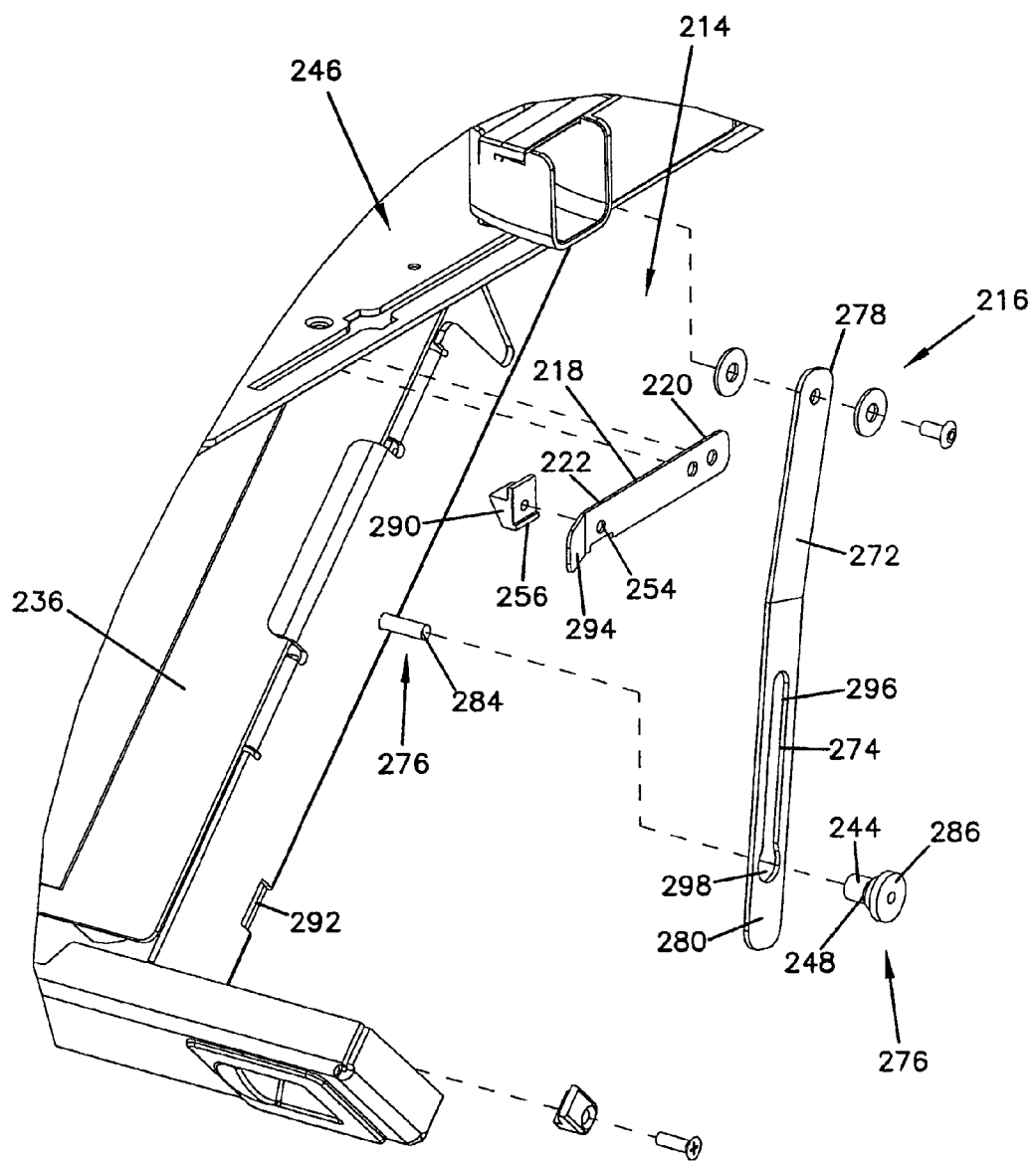
FIG. 14 is an enlarged detail view of FIG. 13.

Referring to FIGS. 13 and 14, the first connection 214 of the connection arrangement 270 includes a first lever arm 218. The lever arm 218 has a first end 220 and a second end 222. The first end 220 of the lever arm 218 is non-pivotally attached to a flange 282 (FIG. 13) of a side plate 242 of the drawer 226 at an attachment location 230.

Figure 16:
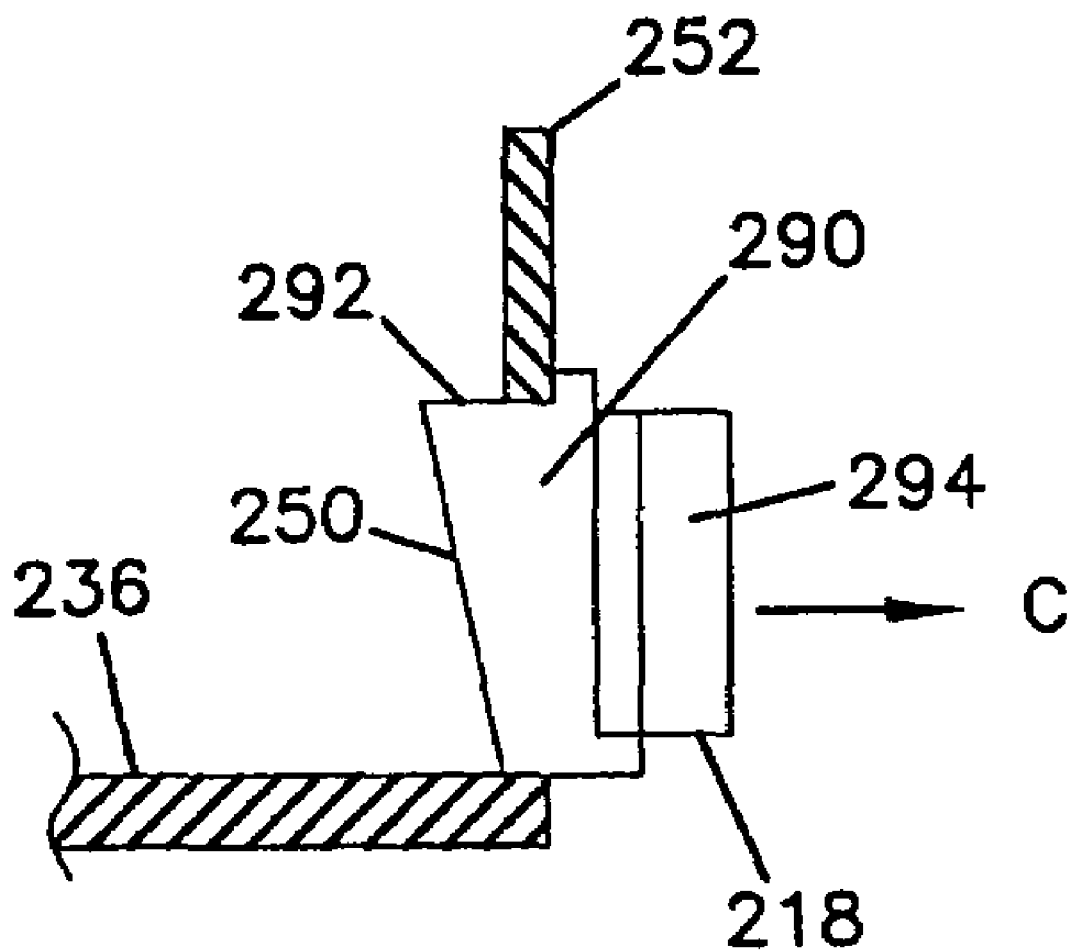
FIG. 16 is a schematic representation of a portion of a connection arrangement shown in FIG. 15.

A lock piece 290 (FIG. 14) is secured to the second end 222 of the lever arm 218. The lever arm 218 can include a guide or locating notch 254 sized to receive locating structure 256 (e.g., a lip) of the lock piece 290. While in the illustrated embodiment, the lock piece 290 is a separate piece from that of the lever arm 218, it is contemplated that the lock piece can be an integral construction of the lever arm. In use, the lock piece 290 functions to releaseably lock the tray 236 in the non-pivoted position. In particular, the lock piece 290 engages a corresponding aperture or hole 292 (see FIGS. 13 and 16) formed in the tray 236 of the drawer 226 to lock the tray 236 in the non-pivoted position.

Still referring to FIGS. 13 and 14, the second connection 216 of the connection arrangement 270 generally includes a second lever arm 272 and a pin assembly 276. The second lever arm 272 has a first end 278 and a second end 280. As shown in FIG. 13, the first end 278 of the lever arm 272 is pivotally attached to the flange 282 of the side plate 242 of the drawer 226 at an attachment location 258. The lever arm 272 is also slidably attached to the tray 236 adjacent to the second end 280 of the arm. That is, the lever arm 272 defines a slide or slot 274 (FIG. 14) that cooperates with the pin assembly 276 to provides a pin and slot connection between the tray 236 and the drawer frame 246.

In the illustrated embodiment, each of the first and second lever arms 218, 272 of the connection arrangement 270 is flexibly constructed. The lever arms 218, 272 can be constructed of spring steel, for example, or in the alternative, can be of a molded construction. In addition, the second end 280 of the lever arm 272 is a biased end having a formed angular construction that acts as a leaf-type spring. In one embodiment, the second end 280 of the lever arm 272 is angled at an approximate 2 degree offset from the first end 278 of the arm.

Referring to FIG. 14, the pin assembly 276 of the connection arrangement 270 includes a bushing or plug body 286 having a first smaller diameter portion 244 and a second larger diameter portion 248. The plug body 286 is mounted on a pin 284, which is attached or affixed to the bottom tray 236.

In use, the flexible construction of the first lever arm 218 permits a technician to release the tray 236 from the locked non-pivoted position by flexing the lever arm 218 in a direction C (FIG. 16) outward from the tray 236. An angled tab 294 is provided at the second end 222 of the arm to assist the technician in grasping and flexing the lever arm. The outward flexure of the lever arm 218 disengages the lock piece 290 from the aperture 292 of the bottom tray 236.

When the lock piece 290 is disengaged from the aperture 292, the tray 236 can be pivoted to the pivoted position shown in FIG. 13. While pivoting the tray 236, the smaller diameter portion 244 of the plug body 286 of the second connection 216 slides within a slide portion 296 (FIG. 14) of the slot 274. Pivoting motion of the tray 236 is limited at a point where the pin assembly 276 seats within an end portion 298 of the slot 274.

As previously described, the second end 280 of the second lever arm 272 is biased outward. While the tray 236 is pivoting downward, the smaller portion diameter 244 of the pin assembly 276 slides within the slide portion 296 of the slot 274. The larger diameter portion 248 of the pin assembly prevents the biased end 280 of the lever arm from springing or moving outward from the tray 236.

When the tray reaches the pivoted position, the tray 236 automatically locks into place. That is, in the pivoted position, the biased end 280 of the lever arm 272 is no longer constrained by the plug body 286. Instead, the end portion 298 of the slot 274 now moves laterally outward to position about or engage the larger diameter 248 of the plug body. The lateral outward movement is caused by the biased construction of the flexible arm 272. Because the slide portion 296 of the slot 274 is sized to receive only the smaller diameter portion 244 of the pin assembly 276, the tray 236 is thereby locked in the pivoted position.

To release the tray from the pivoted, locked position, the lever arm 272 is simply flexed inward toward the tray 236 such that the slot 274 aligns with the smaller diameter portion 244 of the plug body 286. The smaller diameter portion of the plug body 286 then slides upward within the slide portion 296 of the slot 274 as the tray 236 is pivoted back to the non-pivoted position.

Upon returning the tray 236 to the non-pivoted position, a ramped surface 250 (FIG. 16) of the lock piece 290 contacts an edge 252 (see also FIG. 13) of the bottom tray 236. The ramped surface 250 acts as a guide to ease the engagement between the bottom tray 236 and the locking piece 290, and gradually flex the lever arm 218 outward. As the tray 236 is further pivoted, the lock piece 290 seats within the aperture 292 formed in the bottom tray 236 to automatically lock the tray 236 in the non-pivoted position.

The above specification provides a complete description of the invention. Since many embodiments of the invention can be made without departing from the spirit and scope of the invention, certain aspects of the invention reside in the claims hereinafter appended.

What is claimed is:

1. A method of accessing components within a drawer of a cable management panel, the method comprising the steps of:

a) sliding the drawer from a closed position to an open position, the drawer having a front, a rear, opposite sides, and a bottom, the rear and opposite sides defining a drawer frame, the components being mounted to the bottom of the drawer;

b) unlocking the bottom of the opened drawer including flexing a lever arm of a connection arrangement coupled between the bottom of the drawer and the drawer frame; and c) pivoting the unlocked bottom of the opened drawer relative to the drawer frame;

d) wherein the pivoting movement of the drawer is limited by the connection arrangement.

2. The method of claim 1, wherein the step of unlocking the bottom of the drawer includes flexing the lever arm of the connection arrangement in an outward direction from the drawer.

3. The method of claim 2, further including disengaging a lock piece of the lever arm from an aperture formed in the drawer frame.

4. The method of claim 2, wherein the step of pivoting the unlocked bottom of the opened drawer includes sliding a pin assembly within a slide portion of a slot formed in the lever arm.

5. The method of claim 4, wherein the pivoting movement of the unlocked bottom of the opened drawer is limited by contact between the pin assembly and an end portion of the slot.

6. The method of claim 2, wherein the step of pivoting the unlocked bottom of the opened drawer includes sliding a pin assembly within a slide portion of a slot, the slot being formed in another lever arm of the connection arrangement.

7. The method of claim 6, wherein the pivoting movement of the unlocked bottom of the opened drawer is limited by contact between the pin assembly and an end portion of the slot.

8. The method of claim 2, wherein the lever arm is a first lever arm, the method further including unlocking the bottom of the drawer when in a pivoted position by flexing a second lever arm of the connection arrangement in a direction toward the drawer.

9. The method of claim 1, wherein the step of pivoting the bottom of the drawer includes pivoting the bottom from a non-pivoted position to a pivoted position, and wherein the bottom automatically locks in place when the bottom reaches the pivoted position, and automatically locks in place when the bottom is returned to the non-pivoted position.

10. The method of claim 9, further including unlocking the bottom of the drawer when in the pivoted position by flexing the lever arm of the connection arrangement in a direction toward the drawer.

11. The method of claim 1, wherein the step of pivoting the unlocked bottom of the opened drawer includes pivoting the bottom from a generally horizontal orientation to a non-horizontal orientation.

12. The method of claim 1, wherein the step of pivoting the unlocked bottom of the opened drawer includes pivoting the bottom from a first generally vertical orientation to a second generally vertical orientation that is not co-planar with the first vertical orientation.

13. A method of accessing components within a drawer of a cable management panel, the method comprising the steps of:

a) sliding the drawer from a closed position to an open position, the drawer having a front, a rear, opposite sides, and a bottom, the rear and opposite sides defining a drawer frame, the components being mounted to the bottom of the drawer;

b) unlocking the bottom of the opened drawer by flexing a lever arm of a connection arrangement coupled between the bottom of the drawer and the drawer frame in a direction outward from the drawer; and c) pivoting the unlocked bottom of the drawer between a non-pivoted position and a pivoted position, the pivoting movement of the bottom of the drawer being limited by the connection arrangement;

d) wherein the bottom of the drawer automatically locks in place when the bottom reaches the pivoted position, and automatically locks in place when the bottom is returned to the non-pivoted position.

14. A method of accessing components within a drawer of a cable management panel, the method comprising the steps of:

a) sliding the drawer from a closed position to an open position, the drawer having a front, a rear, opposite sides, and a bottom, the rear and opposite sides defining a drawer frame, the components being mounted to the bottom of the drawer;

b) pivoting the bottom of the opened drawer between a non-pivoted position and a pivoted position, the pivoting movement of the bottom of the drawer being limited by the connection arrangement; and c) unlocking the bottom of the drawer when in the pivoted position by flexing a lever arm of a connection arrangement coupled between the bottom of the drawer and the drawer frame in a direction toward the drawer;

d) wherein the bottom of the drawer automatically locks in place when the bottom reaches the pivoted position, and automatically locks in place when the bottom is returned to the non-pivoted position.

* * * * *